US008843495B2

(12) United States Patent
Dobriyal et al.

(10) Patent No.: US 8,843,495 B2
(45) Date of Patent: Sep. 23, 2014

(54) HIGH-EFFICIENCY SELECTION OF RUNTIME RULES FOR PROGRAMMABLE SEARCH

(71) Applicant: International Business Machines Corporation, Armonk, NY (US)

(72) Inventors: Arun Dobriyal, Sunnyvale, CA (US); Monu Kedia, Bengaluru (IN); Sriram Raghavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/964,221

(22) Filed: Aug. 12, 2013

(65) Prior Publication Data

US 2014/0019434 A1 Jan. 16, 2014

Related U.S. Application Data

(63) Continuation of application No. 13/547,171, filed on Jul. 12, 2012, now abandoned.

(51) Int. Cl.
*G06F 17/30* (2006.01)

(52) U.S. Cl.
CPC .................. *G06F 17/30622* (2013.01)
USPC ........................................ 707/737

(58) Field of Classification Search
None
See application file for complete search history.

(56) References Cited

U.S. PATENT DOCUMENTS

| | | | |
|---|---|---|---|
| 5,900,004 A * | 5/1999 | Gipson | 715/236 |
| 7,693,830 B2 | 4/2010 | Guha | |
| 7,840,547 B1 | 11/2010 | Tucker et al. | |
| 8,051,063 B2 | 11/2011 | Guha | |
| 2003/0069877 A1 | 4/2003 | Grefenstette et al. | |
| 2007/0299855 A1* | 12/2007 | Levin | 707/101 |
| 2008/0140632 A1* | 6/2008 | Pandya | 707/3 |
| 2008/0215564 A1 | 9/2008 | Bratseth | |
| 2009/0019000 A1 | 1/2009 | Arends et al. | |
| 2009/0094211 A1 | 4/2009 | Marvit et al. | |
| 2010/0161617 A1* | 6/2010 | Cao et al. | 707/741 |
| 2011/0035403 A1 | 2/2011 | Ismalon | |
| 2011/0040775 A1 | 2/2011 | Dettinger et al. | |
| 2011/0082878 A1 | 4/2011 | Nozaki | |
| 2011/0264647 A1 | 10/2011 | Lu et al. | |

OTHER PUBLICATIONS

Pal et al., A Tool for Fast Indexing and Querying of Graphs, WWW 2011, Mar. 28-Apr. 1, 2011, Hyderabad, India, ACM 978-1-4503-0637—Sep. 11, 2003, pp. 241-244.

(Continued)

*Primary Examiner* — Sherief Badawi
*Assistant Examiner* — Courtney Harmon
(74) *Attorney, Agent, or Firm* — Schmeiser, Olsen & Watts, LLP; John Pivnichny

(57) ABSTRACT

A method and associated systems for the efficient selection of runtime rules for programmable search engines, in which a processor of a computer system translates a set of programmable search-engine runtime rules into a set of fielded documents and then partitions the fielded documents into optimized clusters that are each in turn converted into an inverted index. When a user submits a query, the search engine converts the query into a set of fielded queries and uses the set of inverted indices and the set of fielded queries to identify a candidate subset of the runtime rules. The search engine matches this candidate subset against the input query to select a final set of applicable runtime rules.

32 Claims, 4 Drawing Sheets

(56) References Cited

OTHER PUBLICATIONS

Fagin et al., Rewrite Rules for Search Database Systems, PODS'11, Jun. 13-15, 2011, Athens, Greece, copyright 2011 ACM 978-1-4503-0660—Jul. 11, 2006, 12 pages.

Buckley et al., Automatic Query Expansion Using SMART: TREC 3, 12 pages.

Yan et al., Graph Indexing: A Frequent Structure-based Approach, SIGMOD 2004, Jun. 13-18, 2004, Paris, France, copyright 2004 ACM 1-58113-859—Aug. 4, 2006, 12 pages.

Chaturvedi et al., Optimal Training Data Selection for Rule-based Data cleansing Models, 9 pages.

Lo et al., Mining Quantified Temporal Rules: Formalism, Algorithms, and Evaluation, 10 pages.

Liu et al., Automatic Rule Refinement for Information Extraction, Proceedings of the VLDB Endowment, vol. 3, No. 1, copyright 2010 VLDB Endowment 2150-8097/10/09, 10 pages.

Nan et al., The Application of Association Rules Algorithm on Web Search Engine, copyright 2009, 8 pages.

Notice of Allowance (Mail Date Jul. 10, 2013) for U.S. Appl. No. 13/547,171, filed Jul. 12, 2012, First Named Inventor Arun Dobriyal, Conf. No. 7687.

\* cited by examiner

HIGH-EFFICIENCY SELECTION OF RUNTIME RULES FOR PROGRAMMABLE SEARCH

This application is a continuation application claiming priority to Ser. No. 13/547,171, filed Jul. 12, 2012.

TECHNICAL FIELD

The present invention relates to computerized programmable search engines.

BACKGROUND

Integrating programmable search technology into a computer search engine can greatly increase the quality of search results, but may reduce performance and result in inefficient use of resources.

BRIEF SUMMARY

A first embodiment of the present invention provides a method for the efficient selection of runtime rules for programmable search, said method comprising:

a processor of a computer system translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of an input query and as a function of said plurality of inverted indices, wherein said set of fielded queries satisfies a set of conditions;

said processor selecting a set of candidate rules of said plurality of runtime rules as a function of said set of fielded queries and of said plurality of inverted indices;

said processor selecting a set of applicable rules of said plurality of runtime rules by matching said set of candidate rules against said input query.

A second embodiment of the present invention provides a computer program product, comprising a computer-readable hardware storage device having a computer-readable program code stored therein, said program code configured to be executed by a processor of a computer system to implement a method for the efficient selection of runtime rules for programmable search, said method comprising:

said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of an input query and as a function of said plurality of inverted indices, wherein said set of fielded queries satisfies a set of conditions;

said processor selecting a set of candidate rules of said plurality of runtime rules as a function of said set of fielded queries and of said plurality of inverted indices;

said processor selecting a set of applicable rules of said plurality of runtime rules by matching said set of candidate rules against said input query.

A third embodiment of the present invention provides a computer system comprising a processor, a memory coupled to said processor, and a computer-readable hardware storage device coupled to said processor, said storage device containing program code configured to be run by said processor via the memory to implement a method for the efficient selection of runtime rules for programmable search, said method comprising:

said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of an input query and as a function of said plurality of inverted indices, wherein said set of fielded queries satisfies a set of conditions;

said processor selecting a set of candidate rules of said plurality of runtime rules as a function of said set of fielded queries and of said plurality of inverted indices;

said processor selecting a set of applicable rules of said plurality of runtime rules by matching said set of candidate rules against said input query.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with said computer system is configured to implement a method for the efficient selection of runtime rules for programmable search, said method comprising:

said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of an input query and as a function of said plurality of inverted indices, wherein said set of fielded queries satisfies a set of conditions;

said processor selecting a set of candidate rules of said plurality of runtime rules as a function of said set of fielded queries and of said plurality of inverted indices;

said processor selecting a set of applicable rules of said plurality of runtime rules by matching said set of candidate rules against said input query.

DETAILED DESCRIPTION

Programmable search engines may use "runtime rules" to infer the intended meaning of user-submitted input queries. Each runtime rule attempts to match character strings (or "tokens") comprised by a freeform query against a "rule pattern" specific to that rule. If a match is found, the rule then rewrites the query in a more easily analyzed format defined by a corresponding "rewrite pattern."

This matching function may be resource-intensive, so if a programmable search engine comprises a large number of rules, the engine's performance may depend upon how efficiently the engine selects rules it attempts to match against a query.

The present invention is a system and method for efficiently selecting a candidate set of runtime rules that are likely to match a user query. This selection comprises partitioning a runtime rule set into optimized clusters as a function of their relationships to certain parameters and conditions. When analyzed in conjunction with parameters of an input query, these clusters allow a programmable search engine to identify an optimized subset of potentially applicable candidate rules, thus reducing the number of rules that must be matched against the query.

This invention may be implemented as a method performed by a processor of a computer system, as a computer program product, as a computer system, or as a processor-performed process or service for supporting computer infrastructure.

Figure 1:
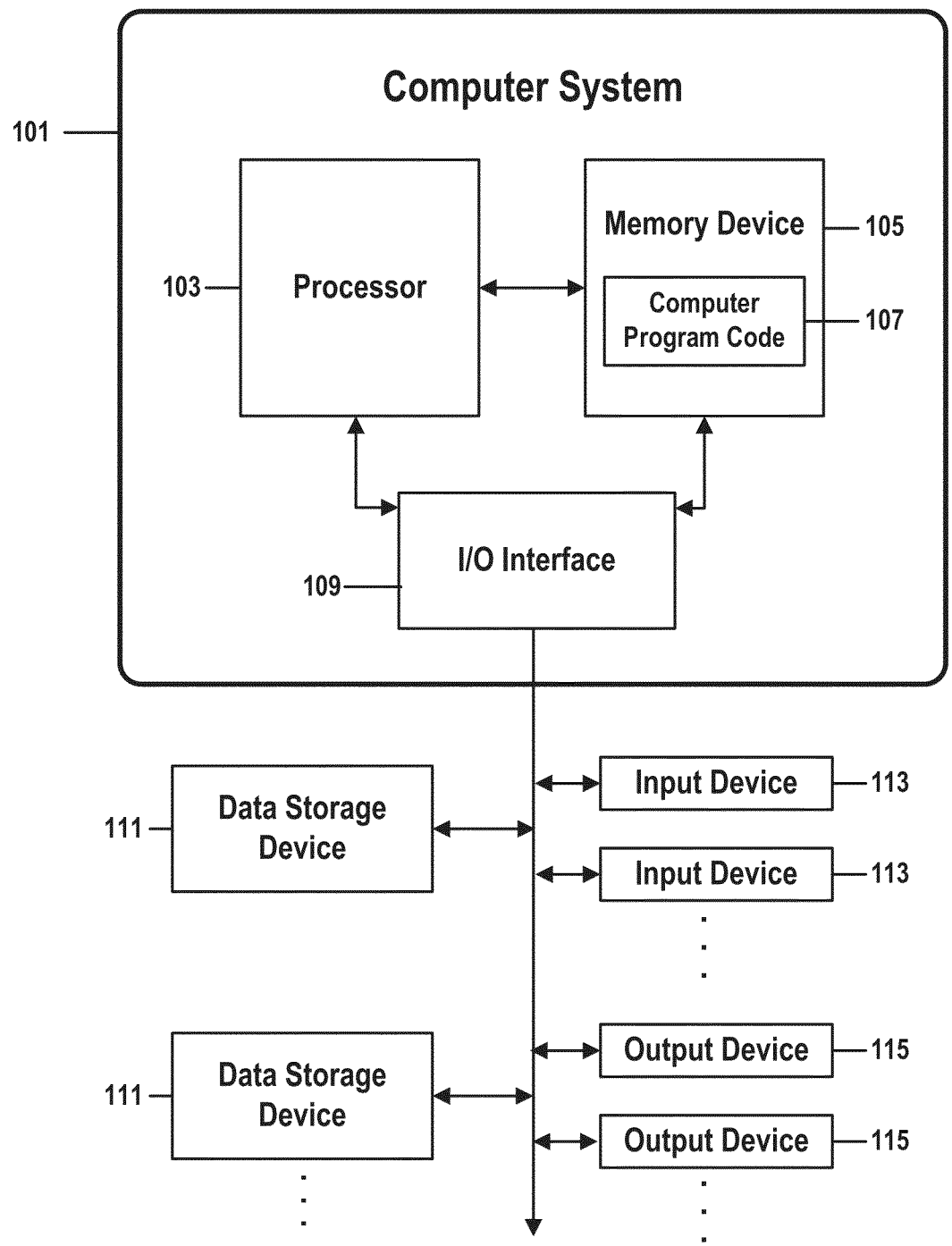
FIG. 1 shows the structure of a computer system and computer program code that may be used to implement a method for the efficient selection of runtime rules for programmable search in accordance with embodiments of the present invention.

FIG. 1 shows the structure of a computer system and computer program code that may be used to implement a method for the efficient selection of runtime rules for programmable search in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for the efficient selection of runtime rules for programmable search in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for the efficient selection of runtime rules for programmable search.

Any of the components of the present invention could be created, integrated, hosted, maintained, deployed, managed, serviced, supported, etc. by a service provider who offers to facilitate a method for the efficient selection of runtime rules for programmable search. Thus the present invention discloses a process for deploying or integrating computing infrastructure, comprising integrating computer-readable code into the computer system 101, wherein the code in combination with the computer system 101 is capable of performing a method for the efficient selection of runtime rules for programmable search.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

Figure 2:
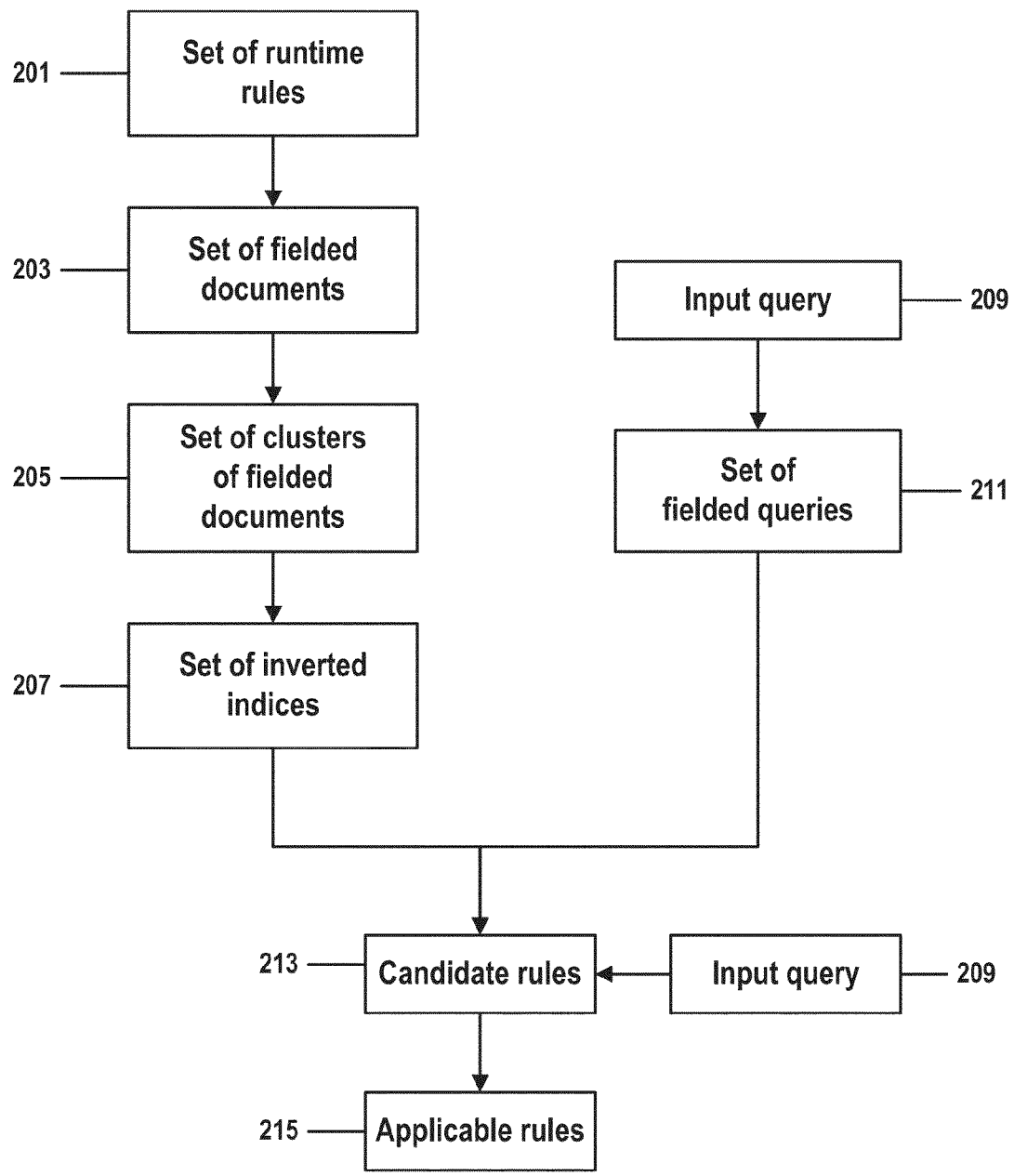
FIG. 2 shows relationships among data structures that are generated as a programmable search engine implements an embodiment of the method of the present invention.

FIG. 2 shows relationships among data structures that are generated as a programmable search engine implements an embodiment of the method of the present invention. FIG. 2 shows elements identified by reference numbers 201-215.

Reference number 201 shows a rule set R of i runtime rules $r_i$, wherein i is a positive integer. Each runtime rule is of the form H1⇒H2, wherein H1 is an antecedent hedge expression and H2 is a consequent hedge expression.

As used herein, the term "hedge" refers to a data structure that comprises an ordered set of binary trees. Each binary tree in such a hedge comprises nodes that each identify a "term" token or a "concept" token. As used herein, a "hedge expression" is a type of hedge that may further comprise nodes that each identifies a "variable" token. The simplest nontrivial example of a hedge expression comprises a single term token.

Concept tokens identify conceptual entities that may be matched to sets of associated keywords (or strings of characters). A "COUNTRY" concept, for example, may be defined to match elements of the set {"America", "India", "Kenya"}.

Term tokens match keywords or strings of characters. "Kenya," "uranium," "telephone," and "news" are all term tokens that may match identical tokens in a user query.

Variable tokens comprise label variable tokens and hedge variable tokens. A label variable token may match a term or a concept and a hedge variable token may match a hedge. Queries cannot contain variables, but a rule pattern that comprises a variable may match that variable against a term or concept token comprised by a query.

Some embodiments may comprise different token categories, different definitions of each token category, and different definitions of the ways that tokens in each category may be used to match tokens of an input query. The embodiments of FIGS. 1-4 describe programmable search engines that comprise concept, term, and variable tokens, but other embodiments may apply analogous methods to search engines that comprise other types of tokens.

In embodiments of the present invention, a runtime rule comprises an ordered pair of hedge expressions known as an antecedent "rule pattern" and a consequent "rewrite pattern." Each rule pattern and each rewrite pattern may comprise binary trees that in turn comprise nodes that may each be a concept token, a term token, or a variable token, as described above. A binary tree may contain a single node.

A runtime rule's hedge expressions comprise implicit logic that may be expressed as a function that rewrites all or part of a query that matches the form of the rule's rule pattern into the form of the rule's rewrite pattern. This rewriting may comprise attempting to match patterns of tokens in the query against patterns of tokens in the runtime rule's rule pattern and then, if a match is found, rewriting the matched tokens into a form defined by the runtime rule's rewrite pattern. Such rules allow programmable search engines to identify a pattern of tokens in a user query 209 and then rewrite that pattern in a more easily analyzed standard form. In other embodiments, a runtime rule may perform other types of actions upon an input query 209, may have a different structure, or may perform different types of functions.

In an example, a programmable search engine may comprise a "COUNTRY" concept that may match tokens of the set {"America", "India", "Kenya"}, a "FN" concept that may match tokens of the set {"find", "distance", "map", and "route"}, and a runtime rule: "FN COUNTRY location COUNTRY".

Here, the runtime rule's rule pattern "FN COUNTRY" comprises two concept tokens and the runtime rule's rewrite pattern "location COUNTRY" comprises a "location" term token and a "COUNTRY" concept token.

A query that consists of the string "map America" would match the runtime rule's rule pattern, by matching the query's "map" token to the rule pattern's "FN" concept token and by matching the query's "America" token to the rule pattern's "COUNTRY" concept token. The runtime rule would then rewrite the matched pattern in the form of its rewrite rule, producing the rewritten query "location America." In a real-world implementation, this rewritten query would be in a form that would be easier to parse or that would possess implicit semantic information.

Reference number 203 shows a set of fielded documents, each of which is extracted from one rule pattern of one runtime rule of the set of runtime rules 201. A fielded document for a rule $r_i$ in R 201 comprises a set of fields that identify all tokens comprised by a rule pattern comprised by rule $r_i$. In the embodiment of FIGS. 1-4, a fielded document for a rule $r_i$ would contain three fields that respectively identify the concept tokens, term tokens, and variable tokens that comprise the rule pattern of rule $r_i$. The order of these three fields may vary in some embodiments, but must be consistent among all fielded documents in a single set of fielded documents 203.

In an example, a fielded document $fd_i$ associated with runtime rule $r_i$ might be of the form $\{t_c, t_t, t_v\}$, wherein field $t_c$ lists concept tokens comprised by the rule pattern of runtime rule $r_i$, field $t_t$ lists term tokens comprised by the rule pattern of runtime rule $r_i$, and field $t_v$ lists variable tokens comprised by the rule pattern of runtime rule $r_i$. A runtime rule $$r_i = \text{"FN COUNTRY} \rightarrow \text{COUNTRY"}$$

that comprises rule pattern "FN COUNTRY," which in turn comprises concept tokens "FN" and "COUNTRY," no term tokens, and no variable tokens, would thus be associated with fielded document $$fd_i = \{(\text{concept:FN, concept:COUNTRY}), (\ ), (\ )\}.$$

Figure 3:
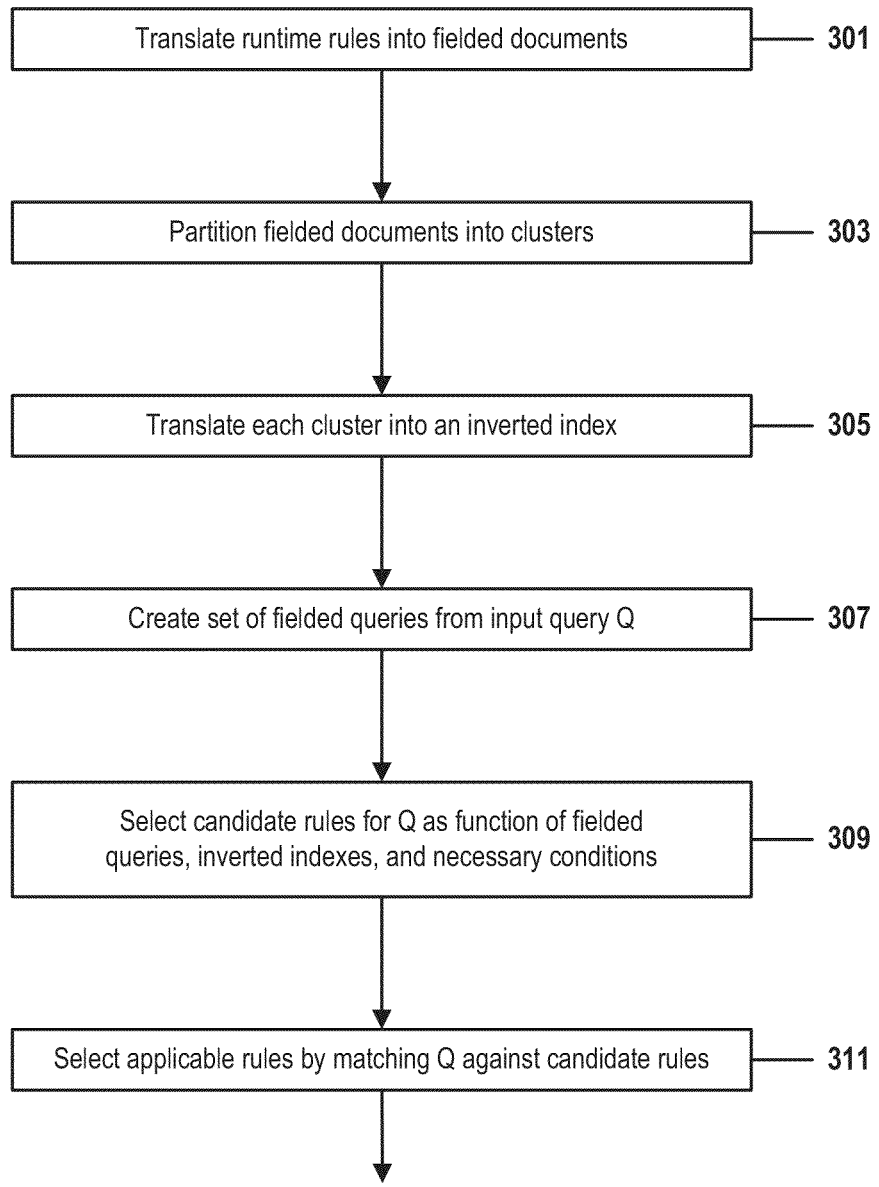
FIG. 3 is a flow chart that illustrates the steps of a method for the efficient selection of runtime rules for programmable search in accordance with embodiments of the present invention.

Reference number 205 shows a set of clusters of fielded documents that is produced from the set of fielded documents 203 by the partitioning procedure of FIG. 3 step 303. In some embodiments, rule set 201 may be partitioned in an analogous manner into a set of clusters of rewrite rules, either in addition to or in place of the partitioning of the set of fielded documents of step 303.

In embodiments described in FIGS. 1-4, the set 205 of clusters of fielded documents comprises all fielded documents comprised by the set 203 of fielded documents. In other embodiments, the set 205 of clusters of fielded documents may comprise a proper subset of all fielded documents of the set 203 of fielded documents.

Each cluster of the set of clusters 205 is associated with a set of derived boundary variables. These boundary variables may be expressed using a "length" operator |, wherein the length of an entity S is equal to the number of tokens comprised by entity S, and wherein a length of entity S is expressed as |S|. If, for example, Concepts($r_i$) is the set of all concept tokens in the rule $r_i$ described above, then |Concepts($r_i$)|=2 because rule $r_i$ as described above contains the two concept tokens FN and COUNTRY.

In embodiments described in FIGS. 1-4, the length of a rule pattern comprised by a runtime rule $r_i$ is generally identical to the length of a fielded document $fd_i$ extracted from runtime rule $r_i$ by the procedure of FIG. 3, step 301 because the number of tokens comprised by the rule pattern of $r_i$ is identical to the number of tokens comprised by $r_i$'s analogous fielded document $fd_i$.

By convention, we define Concepts($r_i$) to be the set of all concept tokens in a rule $r_i$, Terms($r_i$) to be the set of all term tokens in a rule $r_i$, and Variables($r_i$) to be a set of all variable tokens in a rule $r_i$. By convention, we further define Concepts($fd_i$) to be the set of all concept tokens in a fielded document $fd_i$ that corresponds to a rule $r_i$, Terms($fd_i$) to be a set of all term tokens in the fielded document $fd_i$, and Variables($fd_i$) to be a set of all variable tokens in the fielded document $fd_i$.

Using these conventions, the boundary variables for a cluster of fielded documents $C_i$ may comprise:

$MIN_{c,i}$ and $MAX_{c,i}$, wherein $MAX_{c,i}$ is the greatest value of |Concepts($fd_m$)| for any fielded document $fd_m$ in cluster $C_i$ and $MIN_{c,i}$ is the smallest value of |Concepts($fd_n$)| for any fielded document $fd_n$ in cluster $C_i$;

$MK_{t,i}$ and $MAX_{t,i}$, wherein $MAX_{t,i}$ is the greatest value of |Terms($fd_m$)| for any fielded document $fd_m$ in cluster $C_i$ and $MIN_{t,i}$ is the smallest value of |Terms($fd_n$)| for any fielded document $fd_n$ in cluster $C_i$;

$MIN_{v,i}$ and $MAX_{v,i}$, wherein $MAX_{v,i}$ is the greatest value of |Variables($fd_m$)| for any fielded document $fd_m$ in cluster $C_i$ and $MIN_{v,i}$ is the smallest value of |Variables($fd_n$)| for any fielded document $fd_n$ in cluster $C_i$;

$NS_{L,i}$, wherein $NS_{L,i} = MIN_{c,i} + MIN_{t,i} + MIN_{v,i}$; and $NS_{u,i}$, wherein $NS_{u,i}$ is the total length of a fielded document $fd_{min}$ of cluster $C_i$, and wherein no fielded document of cluster $C_i$ has a total length less than $|fd_{min}|$.

In less formal terms, $MIN_{c,i}$ and $MAX_{c,i}$ identify the lower and upper limits of the number of concept tokens contained in any fielded document of cluster $C_i$. $Min_{t,i}$ and $Max_{t,i}$ identify analogous limits for the numbers of terms in any single fielded document of cluster $C_i$, and $Min_{v,i}$ and $Max_{v,i}$ identify analogous boundaries for the number of variables in any single fielded document of cluster $C_i$.

The six fielded documents whose lengths are identified by the Min and Max variables described above may not be distinct, but all six must be contained in the same cluster $C_i$. A distinct set of six Min and Max variables may be defined for each cluster in the set 205 of clusters of fielded documents.

$NS_{L,i}$ identifies the smallest possible number of tokens in a theoretical fielded document that may be assembled from all concept tokens in a first fielded document of $C_i$, all term tokens in a second fielded document of $C_i$, and all variable tokens in a third fielded document of $C_i$, wherein the first, second, and third fielded documents may not be distinct.

$NS_{u,i}$ identifies the length of the shortest fielded document $fd_{min}$ of $C_i$, wherein no fielded document of $C_i$ contains fewer tokens than does $fd_{min}$.

In an example that illustrates how these boundary variables may be determined, consider a cluster $C_i$ that comprises four fielded documents (fd1, fd2, fd3, fd4), wherein each fielded document may contain concept tokens c, term tokens t, and variable tokens v. $C_i$ thus might comprise:

| Fielded Document | Concepts | Terms | Variables |
|---|---|---|---|
| fd1 | c1, c2 | t1 | |
| fd2 | | | v1 |
| fd3 | | | v1, v2 |
| fd4 | c3 | | |

The variables associated with this cluster C, of fielded documents might thus be derived through the following steps:

|Concepts(fd1)|=2[c1, c2]
|Concepts(fd2)|=|Concepts(fd3)|=0
|Concepts(fd4)|=1 [c3]
|Terms(fd1)|=1 [t1]
|Terms(fd2)|=|Terms(fd3)|=|Terms(fd4)|=0
|Variables(fd1)|=0
|Variables(fd2)|=1[v1]
|Variables(fd3)|=2[v1, v2]
|Variables(fd4)|=0

$MIN_{c,i}=0$ [fd2, fd3]; $MIN_{t,i}=0$ [fd2,fd3,fd4]; $MIN_{v,i}=0$ [fd1, fd4]

$MAX_{c,i}=2$ [fd1]; $MAX_{t,i}=1$ [fd1]; $MAX_{v,i}=2$ [fd3]

$NS_L = MIN_{c,i} + MIN_{t,i} + MIN_{v,i} = 0$ $NS_u = |fd2| = |fd4| = 1$ [fd2 and fd4 are the shortest fielded documents of $C_i$]

Reference number 207 identifies a set of inverted indices, each of which corresponds to a cluster $C_i$ of the clusters of fielded documents 205, and wherein cluster $C_i$ comprises fielded documents $fd_{i,1} \ldots fd_{i,m}$. Each inverted index comprises a set of lists, wherein each list in the set of lists corresponds to a token found in any of fielded documents $fd_{i,1} \ldots fd_{i,m}$ that comprise cluster $C_i$. A list that corresponds to a token t enumerates every fielded document in cluster $C_i$ that contains token t. In an embodiment, an inverted index for a cluster of fielded documents $fd_{i,1} \ldots fd_{i,m}$ must contain one list for every token found in any fielded document of the set of fielded documents $fd_{i,1} \ldots fd_{i,m}$.

In a preceding example, cluster $C_i$, which comprises fielded documents fd1 . . . fd4, would correspond to an inverted index $Ind_i$, wherein $Ind_i$ contains an ordered list for each concept token, term token, or variable token in any fielded document in cluster $C_i$. Thus, in this example:

$Ind_i = \{$(concept:c1, fd1), (concept:c2, fd1), (concept:c3, fd4), (term:t1, fd1), (variable:v1, fd2, fd3), (variable:v2, fd3)$\}$.

Reference number 209 identifies a submitted user query or input query Q 209 that comprises an arbitrary set of concept tokens and term tokens in an arbitrary format. In the embodiments of FIGS. 1-4, an input query 209 cannot contain variable tokens.

Reference number 211 identifies a set of fielded queries, wherein each fielded query in the set of fielded queries 211 comprises an ordered sequence of subsets of tokens contained in both user query 209 and in an inverted index of the set of inverted indices 207.

A fielded query that corresponds to a user query Q 209 and to an inverted index $Ind_i$ of the set of inverted indices 207 comprises a three-element sequence of sets of tokens $Q'_{c,i}$, $Q'_{t,i}$, $Q'_{v,i}$, wherein $Q'_{c,i}$ is a subset of the set of concept tokens comprised by both query 209 and by inverted index $Ind_i$, wherein $Q'_{t,i}$ is a subset of the set of term tokens comprised by both query Q 209 and by $Ind_i$, and wherein $Q'_{v,i}$ is a subset of the set of variable tokens comprised by $Ind_i$. Selection of token sets $Q'_{c,i}$, $Q'_{t,i}$, and $Q'_{v,i}$ is further constrained by conditions and functions described in reference numeral 205. In other embodiments, a fielded query may comprise other types of data that may be selected by other criteria.

Figure 4:
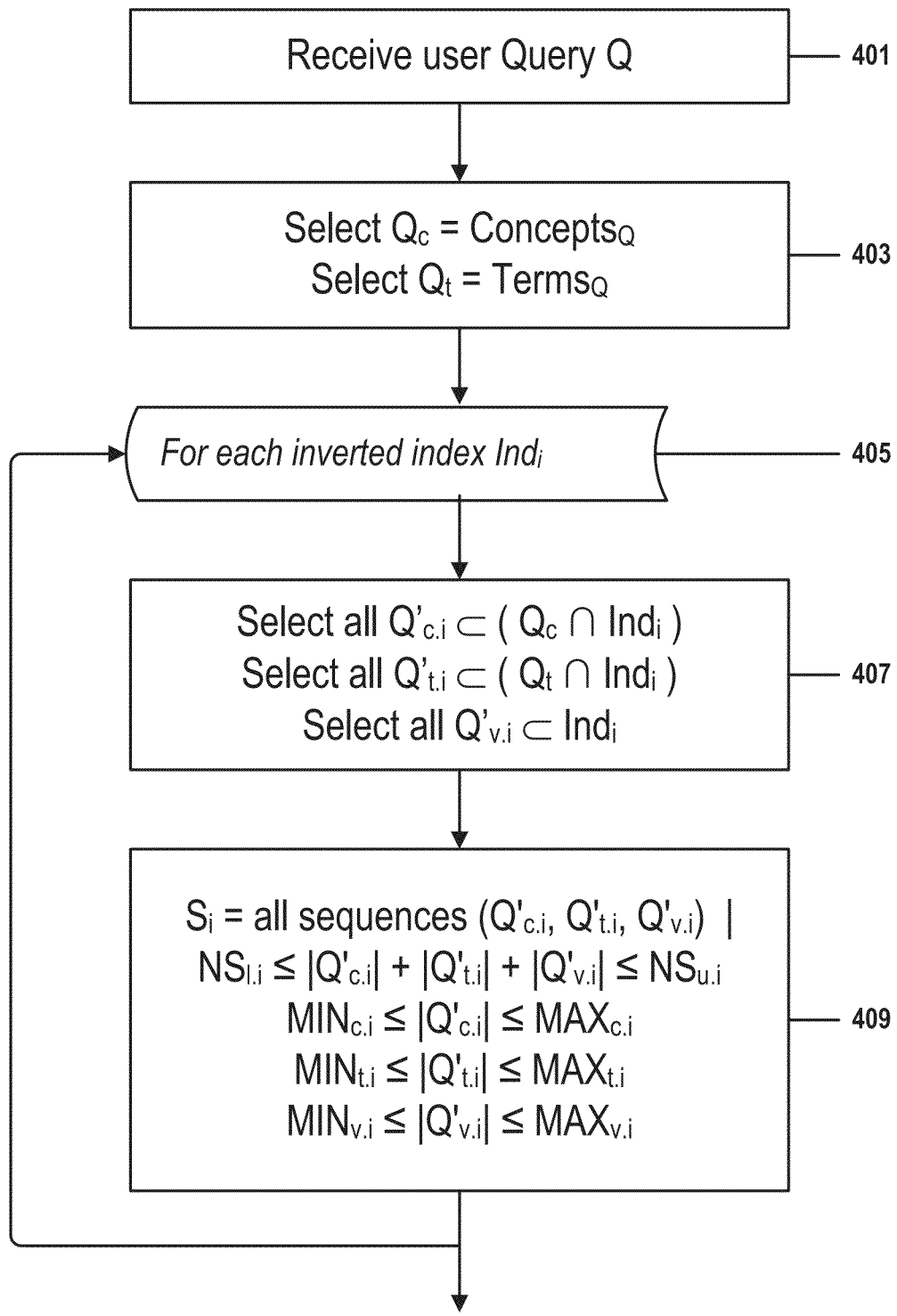
FIG. 4 is a flow chart that elaborates the step of sequence enumeration described in FIG. 3, step 307, in accordance with embodiments of the present invention.

The set of fielded queries 211 is thus comprises all possible ordered sequences of token sets ($Q'_{c,i}$, $Q'_{t,i}$, $Q'_{v,i}$), wherein each sequence is associated with one inverted index $Ind_i$ of the set of inverted indices 207, and wherein each said sequence satisfies conditions described in step 205, in step 307 of FIG. 3, and in FIG. 4.

A set of fielded queries 211 is created through a "sequence enumeration" procedure that is performed once for each input query 209. Each performance of a sequence enumeration procedure in turn comprises an iterative process of FIG. 4 (steps 405-409) that is performed once for each inverted index of a set of inverted indices 207.

Reference number 213 identifies a set of candidate rules, which is a subset of rule set 201 and which comprises runtime rules that may be applicable to query Q. Candidate rules 213 are selected by matching the set of fielded queries 211, which characterize query Q, against each index of the set of inverted indices 207, and then merging the results for all indices in the set of inverted indices 207 into a single candidate rule set.

Reference number 215 identifies the subset of rule set 201 that comprises runtime rules that are applicable to input query Q 209. This set of applicable rules 215 is determined by matching the set of candidate rules 213 to input query Q 209.

FIG. 3 is a flow chart that illustrates the steps of a method for the efficient selection of runtime rules for programmable search in accordance with embodiments of the present invention. FIG. 3 contains steps 301-311 which may be performed by embodiments that incorporate the data structures of FIG. 2. In these embodiments, a programmable search engine may perform steps 301 through 305 once for each runtime rule set R 201 and may perform steps 307-311 once for each input query 209. Step 307 is described in greater detail in FIG. 4.

In step 301, a programmable search engine translates each runtime rule $r_i$ of a set of runtime rules (201 in FIG. 2) into a corresponding fielded document $fd_i$ of a set of fielded documents 203. As explained in the examples and description of reference numeral 201, each runtime rule $r_i$ comprises a pair of hedge expressions known as a rule pattern and a rewrite pattern, wherein each expression of the pair of hedge expressions comprises an ordered set of binary trees, and wherein each node of each binary tree comprises a concept token, a term token, or a variable token.

As explained in the description and examples of FIG. 2, reference numeral 203, each fielded document $fd_i$ is derived from the rule pattern hedge expression of a corresponding rule $r_i$ of rule set 201 and contains a set of fields that identify the tokens comprised by the rule pattern hedge expression of rule $r_i$. In embodiments wherein rule $r_i$ comprises concept tokens, term tokens, and variable tokens, a fielded document $fd_i$ that corresponds to a rule $r_i$ may contain three fields that respectively enumerate the concept tokens, term tokens, and variable tokens that are comprised by rule $r_i$.

In step 303, the set of fielded documents 203 created in step 301 is partitioned into an optimized set of disjoint clusters of fielded documents 205. In embodiments described in FIGS. 1-4, the set 205 of clusters of fielded documents comprises all fielded documents of the set 203 of fielded documents. In other embodiments, the set 205 of clusters of fielded documents may comprise a proper subset of all fielded documents of the set 203 of fielded documents.

In some embodiments, step 303 may partition the set of runtime rules 201 into an analogous optimized set of disjoint clusters and, in such embodiments, subsequent steps of the method of the present invention that act upon clusters of fielded documents 205 instead perform analogous actions upon the clusters of rules.

In the embodiments described herein, the method of optimization comprised by step 303 may be a method of selecting a partitioning strategy that results in a lower total cost, wherein cost may be approximately inversely proportional to a number of applicable runtime rules 215. In other embodiments, cost may be defined in other ways and optimization procedures may be chosen to satisfy other criteria.

The details of partitioning step 303 are implementation-dependent and are determined by a cost function SR that identifies the total cost of a particular choice of partitions, wherein each choice of partitions may comprise a particular division of a set of fielded documents 203 into a specific number of clusters, wherein each such cluster comprises a cluster-specific number of fielded documents, and wherein each such cluster comprises fielded documents that have lengths equal to or greater than the length of a minimum length-threshold value. Software engineers skilled in the art of search-engine design may use optimization techniques well-known in the art to implement the general implementation strategy of step 303 to select an optimal set of partitions.

A total cost function SR returns a total cost of partitioning a set 203 of fielded documents into a set 205 of k clusters of fielded documents $C_1, C_2, \ldots C_k$. A total cost SR is a sum of a set of a set of k individual cluster costs $R_i$, wherein an individual cluster cost $R_i$ may be a function of parameters $S_i$ and $u_i$, wherein $S_i$ is a number of fielded documents comprised by cluster $C_i$, and wherein $NS_{u,i}$ is a length of a shortest fielded document in a cluster $C_i$. In embodiments of the present invention, cost functions $R_i$ may be approximately proportional to $S_i$ and approximately inversely proportional to $u_i$. In some embodiments, a cost function $R_i$ for a cluster $C_i$ may be as simple as $R_i = S_i/u_i$ or $R_i = (S_i)^{**}u_i$.

Given a particular choice of function $R_i$, an optimal partitioning strategy may be identified as a partitioning strategy that results in the lowest value of a sum of a set of individual cluster costs $R_i$ for all clusters $C_i$. In more formal terms, an optimal k-way partitioning strategy is a strategy that minimizes a total cost SR of searching through all k clusters by selecting from a set 203 of fielded documents or analogous runtime rules 201 an approximately smallest possible number of applicable runtime rules 215:

$$\sum_{i=1}^{k} SR = \sum_{i=1}^{k} R_i(S_i, 1/u_i)$$

In empirical testing, acceptable efficiencies have been observed and $R_i$ has been shown to be solvable in polynomial time when $R_i$ is chosen to be of the form:

$$R_i = (S_i + \alpha)/u_i,$$

wherein $\alpha$ is an implementation-dependent "penalty constant" that prevents a function $R_i$ from returning an unacceptably large number of unacceptably small clusters. The definition and use of penalty constants is well-known to those in skilled in fields of computer science and mathematics that are related to the present invention, such as machine learning and artificial intelligence, and to clustering methodologies like those of step 303.

In an example, a rule set $R_x$ 201 comprised of 30 runtime rules $r_x$ might be translated by the procedure of FIG. 3, step 301, into a corresponding set of fielded documents $FD_x$ 203, wherein $FD_x$ is comprised of 30 fielded documents $fd_x$ that are each analogous to one runtime rule $r_x$.

In this example, a total cost function $SR_x$ computed for a partition of $FD_x$ into k clusters would return a value of a sum of a set of values of $R_1 \ldots R_k$, wherein each $R_i$ is a cost of one cluster $C_1 \ldots C_k$. If $R_i$ is defined as a function $R_i = (S_i/u_i)$, wherein $S_i$ is a number of fielded documents contained in a cluster $C_i$, and wherein $u_i$ is a length of a shortest fielded document in a cluster $C_i$, numerical techniques well-known to those skilled in fields of computer science and mathematics related to the present invention may be used to select an optimal partitioning of the set of fielded documents $FD_x$ (and of its corresponding rule set $R_x$) into an optimized set of k clusters of fielded documents 205, such that a corresponding value of total cost SR is minimized.

In an example wherein a desired number of clusters k is arbitrarily set to 4, a resulting optimal partition might result in an optimized set 205 of four clusters of fielded documents $C_1$, $C_2, C_3, C_4$. A minimum cost SR of this optimized partitioning is a lowest possible sum of costs $R_1, R_2, R_3, R_4$, wherein costs $R_1, R_2, R_3, R_4$ are each associated with a corresponding cluster of the optimal set of clusters 205 $C_1, C_2, C_3, C_4$.

Other partitioning methods may not be optimal if they result in a higher value of SR. An optimal partitioning method is not unique for a particular rule set 201 because more than one set of partitions may result in a same minimum value of SR. In some embodiments, however, a minimum value of a cost SR may be identical for all rule sets R 201 that comprise a particular number of rules and a particular minimum rule-length and for all sets of fielded documents 205 that comprise the same particular number of rules and the same particular minimum rule-length.

In step 305, each cluster of the set of clusters of fielded documents 205 is translated into one inverted index of the set of inverted indices 207. As described in the description and examples of reference numeral 207 in FIG. 2, an inverted index Ind, created from cluster $C_i$, wherein cluster $C_i$ comprises fielded documents $fd_j \ldots fd_k$, comprises a set of lists that each correspond to a token t contained in any of fielded documents $fd_j \ldots fd_k$ in cluster $C_i$. As explained in the description and examples of step 207, a list that corresponds to a token t, wherein token t is comprised by any fielded document comprised by cluster $C_i$, enumerates every fielded document in cluster $C_i$ that comprises token t. In an embodiment, an inverted index associated with a cluster $C_i$ of fielded documents must contain one list for each token comprised by any fielded document of cluster $C_i$.

A programmable search engine may performs steps 301 through 305 once for a runtime rule set 201, but may perform steps 307 through 311 once each time a user submits a user input query 209.

In step 307, the programmable search engine translates an input query Q 209 into a set of fielded queries 211 as a function of the contents and embedded logic of a set of inverted indices 207. This step is known as "sequence enumeration" and is further described in FIG. 4.

In step 309, a set of candidate runtime rules 213 is selected from rule set R 201 as a function of a set of inverted indices 207, a set of fielded queries 211, and a set of other conditions. This step may be implemented by procedures well-known to those skilled in the art of search-engine design.

In step 311, the rules comprised by the set of candidate rules 213 are matched against input query 209 to determine a set of applicable rules 215 that are applicable to input query 209. The programmable search engine will then use this set of applicable rules 215 to select search results for query 209. This step may be implemented by procedures well-known to those skilled in the art of search-engine design.

FIG. 4 is a flow chart that elaborates the step of sequence enumeration described in FIG. 3, step 307, in accordance with embodiments of the present invention. FIG. 4 comprises steps 401 through 409.

As described in FIG. 2, reference numeral 211, a fielded query associated with an input query Q 209 comprises an ordered sequence of three sets of tokens $(Q'_{c,i}, Q'_{t,i}, Q'_{v,i})$, wherein a token of any of these three sets is comprised by input query Q 209 and wherein a token of any of these three sets is comprised by one inverted index $Ind_i$ of the set of inverted indices 207, and wherein $Q'_{c,i}$ is a set of concept tokens, $Q'_{t,i}$ is a set of term tokens, and $Q'_{v,i}$ is a set of variable tokens. All fielded queries must contain one set of concept tokens, one set of term tokens, and one set of variable tokens in a consistent, implementation-specific order.

The process of sequence enumeration comprises the creation of a set FQ of fielded queries 211, wherein FQ comprises i subsets $FQ_i$ of fielded queries, and wherein each subset $FQ_i$ comprises a set of all possible ordered sequences $s_i$ for an inverted index $Ind_i$ of a set of inverted indices 207. Each ordered sequence $s_i$ of a set $FQ_i$ of ordered sequences comprises an ordered sequence of a set $Q'_{c,i}$ of concept tokens, a set $Q'_{t,i}$ of term tokens, and a set $Q'_{v,i}$ of variable tokens, wherein tokens comprised by $Q'_{c,i}$, $Q'_{t,i}$, and $Q'_{v,i}$ are comprised by both inverted index $Ind_i$ and by input query Q 209, and wherein each set $FQ_i$ of ordered sequences comprises a set of all possible ordered sequences that satisfy these conditions for $Ind_i$ and that may further satisfy additional conditions described in step 409. Some or all sets of tokens $Q'_{c,i}$, $Q'_{t,i}$, and $Q'_{v,i}$ identified by this process may be empty.

In step 401, the programmable search engine receives an input query Q 209. As described above, a query 209 may comprise concept tokens and term tokens, but may not comprise variable tokens.

In step 403, the search engine identifies the elements of sets $Q_c$ and $Q_t$, wherein $Q_c$ is the set of all concept tokens comprised by query 209 and $Q_t$ is the set of all term tokens comprised by a query 209. In some embodiments, $Q_c$ may comprise a proper subset of the set of all concept tokens comprised by query 209 and $Q_t$ may comprise a proper subset of the set of all term tokens comprised by query 209.

Step 405 initiates an iterative process that comprises steps 405 through 409 and that executes once for every inverted index $Ind_i$ of a set of inverted indices 207.

Step 407 selects token sets $Q'_{c,i}$, $Q'_{t,i}$, and $Q'_{v,i}$, wherein token sets $Q'_{c,i}$ comprise all possible subsets of the intersection of $Q_c$ and inverted index $Ind_i$, token sets $Q'_{t,i}$ comprise all possible subsets of the intersection of $Q_t$ and inverted index $Ind_i$, and token sets $Q'_{v,i}$ comprise all possible subsets of the set of all variable tokens comprised by inverted index $Ind_i$.

Step 409 generates a set $FQ_i$ of all possible fielded queries $(Q'_{c,i}, Q'_{t,i}, Q'_{v,i})$ associated with input query Q 209 and with an inverted index $Ind_i$. The set $FQ_i$ comprises the set of all possible ordered triplets of token subsets $Q'_{c,i}$, $Q'_{t,i}$, and $Q'_{v,i}$, subject to some or all of the conditions described below.

The selection of ordered sequences $(Q'_{c,i}, Q'_{t,i}, Q'_{v,i})$ that comprise set $FQ_i$ is further constrained by boundary conditions that are functions of variables $Min_{c,i}$, $Max_{c,i}$, $Min_{t,i}$, $Max_{t,i}$, $Min_{v,i}$, $Max_{v,i}$, $NS_{u,i}$, and $NS_{l,i}$ defined in the description of the set of clusters of fielded documents 205 of FIG. 2, and wherein these variables describe properties of a set of fielded documents $fd_i$ comprised by a cluster $C_i$, wherein $C_i$ is associated with an inverted index $Ind_i$. These conditions may comprise length operators, wherein a length of an entity that comprises a set of tokens is defined as a number of tokens that are comprised by that set of tokens.

In embodiments, an ordered sequence $(Q'_{c,i}, Q'_{t,i}, Q'_{v,i})$ may thus be required to further satisfy the following conditions, wherein inverted index $Ind_i$ is generated from a cluster of fielded documents $C_i$:

i) a number of concept tokens comprised by set $Q'_{c,i}$ may be no greater than $MAX_{c,i}$, wherein $MAX_{c,i}$ is a largest number of concept tokens comprised by a fielded document of a set of fielded documents comprised by cluster $C_i$, and may be no less than $MIN_{c,i}$, wherein $MIN_{c,i}$ is a smallest number of concept tokens comprised by a fielded document of a set of fielded documents comprised by cluster $C_i$;

ii) a number of term tokens comprised by set $Q'_{t,i}$ may be no greater than $MAX_{t,i}$, wherein $MAX_{t,i}$ is a largest number of concept tokens comprised by a fielded document of a set of fielded documents comprised by cluster $C_i$, and may be no less than $MIN_{t,i}$, wherein $MK_{t,i}$ is a smallest number of term tokens comprised by a fielded document of a set of fielded documents comprised by cluster $C_i$;

iii) a number of variable tokens comprised by set $Q'_{v,i}$ may be no greater than $MAX_{v,i}$, wherein $MAX_{v,i}$ is a largest number of concept tokens comprised by a fielded document of a set of fielded documents comprised by cluster $C_i$, and may be no less than $MIN_{v,i}$, wherein $MIN_{v,i}$ is a smallest number of variable tokens comprised by a fielded document of a set of fielded documents comprised by cluster $C_i$;

iv) a sum of the lengths of $Q'_{c,i}$, $Q'_{t,i}$, and $Q'_{v,i}$ may be no less than a sum $MIN_{c,i}+MIN_{t,i}+MIN_{v,i}$; and v) a sum of the lengths of $Q'_{c,i}$, $Q'_{t,i}$, and $Q'_{v,i}$ may be no greater than a smallest number of tokens comprised by a fielded document of a set of fielded documents comprised by cluster $C_i$.

These boundary conditions may be expressed formally as:
i) $MIN_{c,i} \leq |Q'_{c,i}| \leq MIN_{c,i}$,
ii) $MIN_{t,i} \leq |Q'_{t,i}| \leq MAX_{t,i}$,
iii) $MIN_{v,i} \leq |Q'_{v,i}| \leq MAX_{v,i}$
iv-v) $NS_{l,i} \leq |Q'_{c,i}| + |Q'_{t,i}| + |Q'_{v,i}| \leq NS_{u,i}$ In some embodiments, tokens or sequences may be selected by conditions that may complement, replace, or partially replace the conditions described here.

Upon completion of an iteration of the iterative process of steps 405-409, step 405 is executed and the iterative process repeats for the next instance of inverted index $Ind_i$. If the iterative process has been performed for all inverted indices $Ind_i$ of the set of inverted indices 207, then the procedure of FIG. 4 terminates and the method of the present invention continues with step 309 of FIG. 3.

Upon completion of steps 401 through 409 for all inverted indices $Ind_i$, embodiments of the present invention will have selected a set of fielded queries 211 that comprise all possible ordered sequences $(Q'_c, Q'_t, Q'_v)$ of token sets that satisfy the conditions described in step 409.

What is claimed is:

1. A method for the efficient selection of runtime rules for programmable search, said method comprising:
    a processor of a computer system translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;
    said processor partitioning said plurality of fielded documents into a plurality of disjoint clusters of fielded documents;
    said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;
    said processor generating a set of fielded queries as a function of said plurality of inverted indices, wherein said set of fielded queries satisfies a set of conditions, and wherein a condition of the set of conditions is related to a parameter of the input query; and
    said processor selecting a set of candidate rules of said plurality of runtime rules as a function of said set of fielded queries and of said plurality of inverted indices, and wherein the number of candidate rules comprised by the set of candidate rules is reduced by the requirement that the set of fielded queries satisfy the condition of the set of conditions.

2. The method of claim 1, wherein a token of said first set of tokens comprises a concept token, a term token, or a variable token, wherein said first fielded document comprises a concept field, a term field, and a variable field, and wherein said concept field identifies a set of concept tokens of said first set of tokens, said term field identifies a set of term tokens of said first set of tokens, and said variable field identifies a set of variable tokens of said first set of tokens.

3. The method of claim 1, wherein said partitioning further comprises minimizing a numeric quantity of runtime rules that are applicable to a user query, and wherein said minimizing comprises a function of a numeric quantity of clusters comprised by said plurality of disjoint clusters, a function of a numeric quantity of fielded documents comprised by a partitioned disjoint cluster of said plurality of disjoint clusters, a function of a numeric quantity of tokens comprised by a partitioned fielded document of said partitioned disjoint cluster, or a combination thereof.

4. The method of claim 1, wherein a first fielded query of said set of fielded queries is associated with said input query and with said first inverted index, wherein said first fielded query comprises a first conditioned subset of concept tokens of said plurality of tokens, a second conditioned subset of term tokens of said plurality of tokens, and a third conditioned subset of variable tokens of said plurality of tokens, wherein said first conditioned subset is a subset of a set of concept tokens comprised by an intersection of said input query and said first inverted index, wherein said second conditioned subset is a subset of a set of term tokens comprised by an intersection of said input query and said first inverted index, and wherein said third conditioned subset is a subset of a set of variable tokens comprised by said first inverted index.

5. The method of claim 4, wherein said set of conditions require that a first sum of a number of tokens in said first conditioned subset plus a number of tokens in said second conditioned subset plus a number of tokens in said third conditioned subset be no less than a second sum of a number of concept tokens in a first minimum fielded document of said first cluster plus a number of term tokens in a second minimum fielded document of said first cluster plus a number of variable term tokens in a third minimum fielded document of said first cluster, wherein no fielded document of said first cluster contains fewer concept tokens than does said first minimum fielded document, no fielded document of said first cluster contains fewer term tokens than does said second minimum fielded document, and no fielded document of said first cluster contains fewer variable tokens than does said third minimum fielded document, and wherein said first sum be no greater than a total number of tokens in a fourth minimum fielded document, wherein no fielded document of said first cluster contains fewer tokens than does said fourth minimum fielded document.

6. The method of claim 1, further comprising providing at least one support service for at least one of creating, integrating, hosting, maintaining, and deploying computer-readable program code in the computer system, wherein the computer-readable program code in combination with the computer system is configured to implement the translating, partitioning, converting, generating, and selecting.

7. A computer program product, comprising a computer-readable hardware storage device having a computer-readable program code stored therein, said program code configured to be executed by a processor of a computer system to implement a method for the efficient selection of runtime rules for programmable search, said method comprising:
    said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of said plurality of inverted indices, wherein said set of fielded queries satisfies a set of conditions, and wherein a condition of the set of conditions is related to a parameter of the input query; and said processor selecting a set of candidate rules of said plurality of runtime rules as a function of said set of fielded queries and of said plurality of inverted indices, and wherein the number of candidate rules comprised by the set of candidate rules is reduced by the requirement that the set of fielded queries satisfy the condition of the set of conditions.

8. The computer program product of claim 7, wherein a token of said first set of tokens comprises a concept token, a term token, or a variable token, wherein said first fielded document comprises a concept field, a term field, and a variable field, and wherein said concept field identifies a set of concept tokens of said first set of tokens, said term field identifies a set of term tokens of said first set of tokens, and said variable field identifies a set of variable tokens of said first set of tokens.

9. The computer program product of claim 7, wherein said partitioning further comprises minimizing a numeric quantity of runtime rules that are applicable to a user query, and wherein said minimizing comprises a function of a numeric quantity of clusters comprised by said plurality of disjoint clusters, a function of a numeric quantity of fielded documents comprised by a partitioned disjoint cluster of said plurality of disjoint clusters, a function of a numeric quantity of tokens comprised by a partitioned fielded document of said partitioned disjoint cluster, or a combination thereof.

10. The computer program product of claim 7, wherein a first fielded query of said set of fielded queries is associated with said input query and with said first inverted index, wherein said first fielded query comprises a first conditioned subset of concept tokens of said plurality of tokens, a second conditioned subset of term tokens of said plurality of tokens, and a third conditioned subset of variable tokens of said plurality of tokens, wherein said first conditioned subset is a subset of a set of concept tokens comprised by an intersection of said input query and said first inverted index, wherein said second conditioned subset is a subset of a set of term tokens comprised by an intersection of said input query and said first inverted index, and wherein said third conditioned subset is a subset of a set of variable tokens comprised by said first inverted index.

11. The computer program product of claim 10, wherein said set of conditions require that a first sum of a number of tokens in said first conditioned subset plus a number of tokens in said second conditioned subset plus a number of tokens in said third conditioned subset be no less than a second sum of a number of concept tokens in a first minimum fielded document of said first cluster plus a number of term tokens in a second minimum fielded document of said first cluster plus a number of variable term tokens in a third minimum fielded document of said first cluster, wherein no fielded document of said first cluster contains fewer concept tokens than does said first minimum fielded document, no fielded document of said first cluster contains fewer term tokens than does said second minimum fielded document, and no fielded document of said first cluster contains fewer variable tokens than does said third minimum fielded document, and wherein said first sum be no greater than a total number of tokens in a fourth minimum fielded document, wherein no fielded document of said first cluster contains fewer tokens than does said fourth minimum fielded document.

12. A computer system comprising a processor, a memory coupled to said processor, and a computer-readable hardware storage device coupled to said processor, said storage device containing program code configured to be run by said processor via the memory to implement a method for the efficient selection of runtime rules for programmable search, said method comprising:

said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of said plurality of inverted indices, wherein said set of fielded queries satisfies a set of conditions, and wherein a condition of the set of conditions is related to a parameter of the input query; and said processor selecting a set of candidate rules of said plurality of runtime rules as a function of said set of fielded queries and of said plurality of inverted indices, and wherein the number of candidate rules comprised by the set of candidate rules is reduced by the requirement that the set of fielded queries satisfy the condition of the set of conditions.

13. The system of claim 12, wherein a token of said first set of tokens comprises a concept token, a term token, or a variable token, wherein said first fielded document comprises a concept field, a term field, and a variable field, and wherein said concept field identifies a set of concept tokens of said first set of tokens, said term field identifies a set of term tokens of said first set of tokens, and said variable field identifies a set of variable tokens of said first set of tokens.

14. The system of claim 12, wherein said partitioning further comprises minimizing a numeric quantity of runtime rules that are applicable to a user query, and wherein said minimizing comprises a function of a numeric quantity of clusters comprised by said plurality of disjoint clusters, a function of a numeric quantity of fielded documents comprised by a partitioned disjoint cluster of said plurality of disjoint clusters, a function of a numeric quantity of tokens comprised by a partitioned fielded document of said partitioned disjoint cluster, or a combination thereof.

15. The system of claim 12, wherein a first fielded query of said set of fielded queries is associated with said input query and with said first inverted index, wherein said first fielded query comprises a first conditioned subset of concept tokens of said plurality of tokens, a second conditioned subset of term tokens of said plurality of tokens, and a third conditioned subset of variable tokens of said plurality of tokens, wherein said first conditioned subset is a subset of a set of concept tokens comprised by an intersection of said input query and said first inverted index, wherein said second conditioned subset is a subset of a set of term tokens comprised by an intersection of said input query and said first inverted index, and wherein said third conditioned subset is a subset of a set of variable tokens comprised by said first inverted index.

16. The system of claim 15, wherein said set of conditions require that a first sum of a number of tokens in said first conditioned subset plus a number of tokens in said second conditioned subset plus a number of tokens in said third conditioned subset be no less than a second sum of a number of concept tokens in a first minimum fielded document of said first cluster plus a number of term tokens in a second minimum fielded document of said first cluster plus a number of variable term tokens in a third minimum fielded document of said first cluster, wherein no fielded document of said first cluster contains fewer concept tokens than does said first minimum fielded document, no fielded document of said first cluster contains fewer term tokens than does said second minimum fielded document, and no fielded document of said first cluster contains fewer variable tokens than does said third minimum fielded document, and wherein said first sum be no greater than a total number of tokens in a fourth minimum fielded document, wherein no fielded document of said first cluster contains fewer tokens than does said fourth minimum fielded document.

17. A method for the efficient selection of runtime rules for programmable search, said method comprising:
a processor of a computer system translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;
said processor partitioning said plurality of fielded documents into a plurality of disjoint clusters of fielded documents;
said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;
said processor generating a set of fielded queries as a function of an input query and as a function of said plurality of inverted indices, wherein said set of fielded queries satisfies a set of conditions;
said processor selecting a set of candidate rules of said plurality of runtime rules as a function of said set of fielded queries and of said plurality of inverted indices; and
said processor identifying a set of applicable rules of said plurality of runtime rules by matching said set of candidate rules against said input query.

18. The method of claim 17, wherein a token of said first set of tokens comprises a concept token, a term token, or a variable token, wherein said first fielded document comprises a concept field, a term field, and a variable field, and wherein said concept field identifies a set of concept tokens of said first set of tokens, said term field identifies a set of term tokens of said first set of tokens, and said variable field identifies a set of variable tokens of said first set of tokens.

19. The method of claim 17, wherein said partitioning further comprises minimizing a numeric quantity of runtime rules that are applicable to a user query, and wherein said minimizing comprises a function of a numeric quantity of clusters comprised by said plurality of disjoint clusters, a function of a numeric quantity of fielded documents comprised by a partitioned disjoint cluster of said plurality of disjoint clusters, a function of a numeric quantity of tokens comprised by a partitioned fielded document of said partitioned disjoint cluster, or a combination thereof.

20. The method of claim 17, wherein a first fielded query of said set of fielded queries is associated with said input query and with said first inverted index, wherein said first fielded query comprises a first conditioned subset of concept tokens of said plurality of tokens, a second conditioned subset of term tokens of said plurality of tokens, and a third conditioned subset of variable tokens of said plurality of tokens, wherein said first conditioned subset is a subset of a set of concept tokens comprised by an intersection of said input query and said first inverted index, wherein said second conditioned subset is a subset of a set of term tokens comprised by an intersection of said input query and said first inverted index, and wherein said third conditioned subset is a subset of a set of variable tokens comprised by said first inverted index.

21. The method of claim 20, wherein said set of conditions require that a first sum of a number of tokens in said first conditioned subset plus a number of tokens in said second conditioned subset plus a number of tokens in said third conditioned subset be no less than a second sum of a number of concept tokens in a first minimum fielded document of said first cluster plus a number of term tokens in a second minimum fielded document of said first cluster plus a number of variable term tokens in a third minimum fielded document of said first cluster, wherein no fielded document of said first cluster contains fewer concept tokens than does said first minimum fielded document, no fielded document of said first cluster contains fewer term tokens than does said second minimum fielded document, and no fielded document of said first cluster contains fewer variable tokens than does said third minimum fielded document, and wherein said first sum be no greater than a total number of tokens in a fourth minimum fielded document, wherein no fielded document of said first cluster contains fewer tokens than does said fourth minimum fielded document.

22. The method of claim 17, further comprising providing at least one support service for at least one of creating, integrating, hosting, maintaining, and deploying computer-readable program code in the computer system, wherein the computer-readable program code in combination with the computer system is configured to implement the translating, partitioning, converting, generating, selecting, and identifying.

23. A computer program product, comprising a computer-readable hardware storage device having a computer-readable program code stored therein, said program code configured to be executed by a processor of a computer system to implement a method for the efficient selection of runtime rules for programmable search, said method comprising:
said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of an input query and as a function of said plurality of inverted indices, wherein said set of fielded queries satisfies a set of conditions;

said processor selecting a set of candidate rules of said plurality of runtime rules as a function of said set of fielded queries and of said plurality of inverted indices; and said processor identifying a set of applicable rules of said plurality of runtime rules by matching said set of candidate rules against said input query.

24. The computer program product of claim 23, wherein a token of said first set of tokens comprises a concept token, a term token, or a variable token, wherein said first fielded document comprises a concept field, a term field, and a variable field, and wherein said concept field identifies a set of concept tokens of said first set of tokens, said term field identifies a set of term tokens of said first set of tokens, and said variable field identifies a set of variable tokens of said first set of tokens.

25. The computer program product of claim 23, wherein said partitioning further comprises minimizing a numeric quantity of runtime rules that are applicable to a user query, and wherein said minimizing comprises a function of a numeric quantity of clusters comprised by said plurality of disjoint clusters, a function of a numeric quantity of fielded documents comprised by a partitioned disjoint cluster of said plurality of disjoint clusters, a function of a numeric quantity of tokens comprised by a partitioned fielded document of said partitioned disjoint cluster, or a combination thereof.

26. The computer program product of claim 23, wherein a first fielded query of said set of fielded queries is associated with said input query and with said first inverted index, wherein said first fielded query comprises a first conditioned subset of concept tokens of said plurality of tokens, a second conditioned subset of term tokens of said plurality of tokens, and a third conditioned subset of variable tokens of said plurality of tokens, wherein said first conditioned subset is a subset of a set of concept tokens comprised by an intersection of said input query and said first inverted index, wherein said second conditioned subset is a subset of a set of term tokens comprised by an intersection of said input query and said first inverted index, and wherein said third conditioned subset is a subset of a set of variable tokens comprised by said first inverted index.

27. The computer program product of claim 26, wherein said set of conditions require that a first sum of a number of tokens in said first conditioned subset plus a number of tokens in said second conditioned subset plus a number of tokens in said third conditioned subset be no less than a second sum of a number of concept tokens in a first minimum fielded document of said first cluster plus a number of term tokens in a second minimum fielded document of said first cluster plus a number of variable term tokens in a third minimum fielded document of said first cluster, wherein no fielded document of said first cluster contains fewer concept tokens than does said first minimum fielded document, no fielded document of said first cluster contains fewer term tokens than does said second minimum fielded document, and no fielded document of said first cluster contains fewer variable tokens than does said third minimum fielded document, and wherein said first sum be no greater than a total number of tokens in a fourth minimum fielded document, wherein no fielded document of said first cluster contains fewer tokens than does said fourth minimum fielded document.

28. A computer system comprising a processor, a memory coupled to said processor, and a computer-readable hardware storage device coupled to said processor, said storage device containing program code configured to be run by said processor via the memory to implement a method for the efficient selection of runtime rules for programmable search, said method comprising:

said processor translating a plurality of runtime rules into a plurality of fielded documents, wherein a first runtime rule of said plurality of runtime rules comprises a first rule pattern and a first rewrite pattern, wherein said first rule pattern comprises a first set of tokens of a plurality of tokens, and wherein a first fielded document of said plurality of fielded documents comprises said first set of tokens;

said processor partitioning said plurality of fielded documents into a plurality of disjoint clusters of fielded documents;

said processor converting a first cluster of said plurality of disjoint clusters into a first inverted index of a plurality of inverted indices, wherein said first inverted index associates a first token comprised by said first cluster with a related subset of fielded documents of said first cluster, and wherein a fielded document of said related subset comprises said first token;

said processor generating a set of fielded queries as a function of an input query and as a function of said plurality of inverted indices, wherein said set of fielded queries satisfies a set of conditions;

said processor selecting a set of candidate rules of said plurality of runtime rules as a function of said set of fielded queries and of said plurality of inverted indices; and said processor identifying a set of applicable rules of said plurality of runtime rules by matching said set of candidate rules against said input query.

29. The system of claim 28, wherein a token of said first set of tokens comprises a concept token, a term token, or a variable token, wherein said first fielded document comprises a concept field, a term field, and a variable field, and wherein said concept field identifies a set of concept tokens of said first set of tokens, said term field identifies a set of term tokens of said first set of tokens, and said variable field identifies a set of variable tokens of said first set of tokens.

30. The system of claim 28, wherein said partitioning further comprises minimizing a numeric quantity of runtime rules that are applicable to a user query, and wherein said minimizing comprises a function of a numeric quantity of clusters comprised by said plurality of disjoint clusters, a function of a numeric quantity of fielded documents comprised by a partitioned disjoint cluster of said plurality of disjoint clusters, a function of a numeric quantity of tokens comprised by a partitioned fielded document of said partitioned disjoint cluster, or a combination thereof.

31. The system of claim 28, wherein a first fielded query of said set of fielded queries is associated with said input query and with said first inverted index, wherein said first fielded query comprises a first conditioned subset of concept tokens of said plurality of tokens, a second conditioned subset of term tokens of said plurality of tokens, and a third conditioned subset of variable tokens of said plurality of tokens, wherein said first conditioned subset is a subset of a set of concept tokens comprised by an intersection of said input query and said first inverted index, wherein said second conditioned subset is a subset of a set of term tokens comprised by an intersection of said input query and said first inverted index, and wherein said third conditioned subset is a subset of a set of variable tokens comprised by said first inverted index.

32. The system of claim 31, wherein said set of conditions require that a first sum of a number of tokens in said first conditioned subset plus a number of tokens in said second conditioned subset plus a number of tokens in said third conditioned subset be no less than a second sum of a number of concept tokens in a first minimum fielded document of said first cluster plus a number of term tokens in a second minimum fielded document of said first cluster plus a number of variable term tokens in a third minimum fielded document of said first cluster, wherein no fielded document of said first cluster contains fewer concept tokens than does said first minimum fielded document, no fielded document of said first cluster contains fewer term tokens than does said second minimum fielded document, and no fielded document of said first cluster contains fewer variable tokens than does said third minimum fielded document, and wherein said first sum be no greater than a total number of tokens in a fourth minimum fielded document, wherein no fielded document of said first cluster contains fewer tokens than does said fourth minimum fielded document.

\* \* \* \* \*